US012541562B1

(12) United States Patent
Mei

(10) Patent No.: US 12,541,562 B1
(45) Date of Patent: Feb. 3, 2026

(54) FUZZY SEARCH ENGINES FOR NETWORK DATABASES

(71) Applicant: Meta Platforms, Inc., Menlo Park, CA (US)

(72) Inventor: Jun Mei, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 613 days.

(21) Appl. No.: 18/056,030

(22) Filed: Nov. 16, 2022

Related U.S. Application Data

(60) Provisional application No. 63/417,194, filed on Oct. 18, 2022.

(51) Int. Cl.
| | | |
|---|---|---|
| *G06F 17/27* | (2006.01) | |
| *G06F 16/9532* | (2019.01) | |
| *G06F 16/955* | (2019.01) | |
| *G06F 40/30* | (2020.01) | |
| *G06F 40/47* | (2020.01) | |

(52) U.S. Cl.
CPC ...... *G06F 16/9532* (2019.01); *G06F 16/9566* (2019.01); *G06F 40/30* (2020.01); *G06F 40/47* (2020.01)

(58) Field of Classification Search
CPC .. G06F 16/9532; G06F 16/9566; G06F 40/47; G06F 40/30; G06F 16/435
USPC .......................................................... 704/9
See application file for complete search history.

(56) References Cited

U.S. PATENT DOCUMENTS

| | | | |
|---|---|---|---|
| 10,353,951 B1 * | 7/2019 | Li | .................. G06F 16/435 |
| 11,100,179 B1 | 8/2021 | Zhou et al. | |
| 11,269,952 B1 | 3/2022 | Sun et al. | |
| 11,308,164 B2 | 4/2022 | Akulov | |
| 2011/0202515 A1 * | 8/2011 | Stiers | .................. G06F 16/435 |
| | | | 707/706 |

(Continued)

FOREIGN PATENT DOCUMENTS

| | | | | |
|---|---|---|---|---|
| CN | 106250453 A | * | 12/2016 | ......... G06F 21/6227 |
| CN | 108614845 B | * | 8/2020 | ............. G06N 3/045 |

OTHER PUBLICATIONS

Nakkirtha V.V., et al., "Build K-Nearest Neighbor (k-NN) Similarity Search Engine with Elasticsearch," Open Search, Apr. 6, 2020, Retrieved from the Internet: URL: https://opensearch.org/blog/odfe-updates/2020/04/Building-k-Nearest-Neighbor-(k-NN)-Similarity-Search-Engine-with-Elasticsearch/.

*Primary Examiner* — Md S Elahee
(74) *Attorney, Agent, or Firm* — EVERSHEDS SUTHERLAND (US) LLP

(57) ABSTRACT

A method for displaying a search result to a user in a client device is provided. The method includes receiving, in a server, a search query from a user, the search query including a string of text characters. The method also includes converting the search query into a sequence of numbers based on a semantic content of the string of text characters, the sequence of numbers defining a vicinity in a multidimensional space, identifying a text string associated with a point within the vicinity in the multidimensional space, ranking the text string according to a similarity value with the search query, and providing a link to a media file associated with the text string to the user as a search result. A system, a memory storing instructions which, when executed by a processor cause the system to perform the above method, and the processor are also provided.

17 Claims, 8 Drawing Sheets

(56) References Cited

U.S. PATENT DOCUMENTS

2020/0104687 A1 4/2020 Gesmundo
2021/0406321 A1 12/2021 Li et al.

* cited by examiner

FUZZY SEARCH ENGINES FOR NETWORK DATABASES

CROSS-REFERENCE TO RELATED APPLICATIONS

The present disclosure is related and claims priority under 35 USC § 119 (e) to U.S. Prov. Appln. No. 63/417,194, entitled FUZZY SEARCH ENGINES FOR NETWORK DATABASES, filed on Oct. 18, 2022, to Jun MEI, the contents of which are herein incorporated by reference in their entirety.

BACKGROUND

Field

The present disclosure relates generally to a search engine for network databases. More specifically, the present disclosure relates to a search engine over items within an open set in the vicinity of a search query positioned in a multidimensional space defined by the semantic context of the search query.

Related Art

Search engines in network databases are constrained by compact criteria that are not suitable to handle discrete variables (e.g., variables that can take only positive integer values), or Boolean logic. Accordingly, in customary searches, these variables are simply left out of the analysis, or improperly incorporated, leading to inaccurate results that tend to be largely disregarded by users.

SUMMARY

In a first embodiment, a computer-implemented method, includes receiving, in a server, a search query from a user, the search query including a string of text characters, converting the search query into a sequence of numbers based on a semantic content of the string of text characters, the sequence of numbers defining a vicinity in a multidimensional space, identifying a text string associated with a point within the vicinity in the multidimensional space, ranking the text string according to a similarity value with the search query, and providing a link to a media file associated with the text string to the user as a search result.

In a second embodiment, a system includes a memory storing multiple instructions, and one or more processors configured to execute the instructions to cause the system to perform operations. The operations include to receive, in a server, a search query from a user, the search query including a string of text characters, to convert the search query into a sequence of numbers based on a semantic content of the string of text characters, the sequence of numbers defining a vicinity in a multidimensional space, to identify a text string associated with a point within the vicinity in the multidimensional space, to rank the text string according to a similarity value with the search query, and to provide a link to a media file associated with the text string to the user as a search result.

In a third embodiment, a computer-implemented method includes providing, to a server, via a client device, a search query in a first language from a user, the search query including a string of text characters, receiving, from the server, a list of media files ranked in order of relevance relative to the search query, wherein a rank is given based on a distance between a caption for each media file and a semantic content of the search query, selecting, a media file from the list of media files, and downloading the media file into the client device.

In other embodiments, a non-transitory, computer-readable medium stores instructions which, when executed by a processor, cause a computer to perform a method. The method includes receiving, in a server, a search query from a user, the search query including a string of text characters, converting the search query into a sequence of numbers based on a semantic content of the string of text characters, the sequence of numbers defining a vicinity in a multidimensional space, identifying a text string associated with a point within the vicinity in the multidimensional space, ranking the text string according to a similarity value with the search query, and providing a link to a media file associated with the text string to the user as a search result.

In yet other embodiments, a system includes a first means to store instructions and a second means to execute the instructions to cause the system to perform a method. The method includes receiving, in a server, a search query from a user, the search query including a string of text characters, converting the search query into a sequence of numbers based on a semantic content of the string of text characters, the sequence of numbers defining a vicinity in a multidimensional space, identifying a text string associated with a point within the vicinity in the multidimensional space, ranking the text string according to a similarity value with the search query, and providing a link to a media file associated with the text string to the user as a search result.

These and other embodiments will become clear to one of ordinary skill in the art based upon the following disclosure.

BRIEF DESCRIPTION OF THE FIGURES

In the figures, the same or similar reference numerals are associated with the same or similar features or attributes, unless explicitly stated otherwise.

DETAILED DESCRIPTION

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

General Overview

Search engines available to users of web applications and other network services struggle to keep a customer base in a highly competitive environment. A good measure of the success of a search engine is that users tend to select and download items provided as part of the search result. Search engines in network databases are constrained by compact criteria that are not suitable to handle discrete variables (e.g., variables that can take only positive integer values), or Boolean logic. Compact criteria define closed sets in the vicinity as any given location in a multidimensional space including items in a database (e.g., as defined by ≤, or ≥ comparison operations). Accordingly, in customary searches, these variables are simply left out of the analysis, or improperly incorporated, leading to inaccurate results that tend to be largely disregarded by users.

To resolve the above technical problem, embodiments as disclosed herein use a fuzzy search wherein open set criteria (e.g., as defined by <, or > comparison operations) allow search results to be found within an open vicinity of points in the multidimensional space.

Example System Architecture

Figure 1:
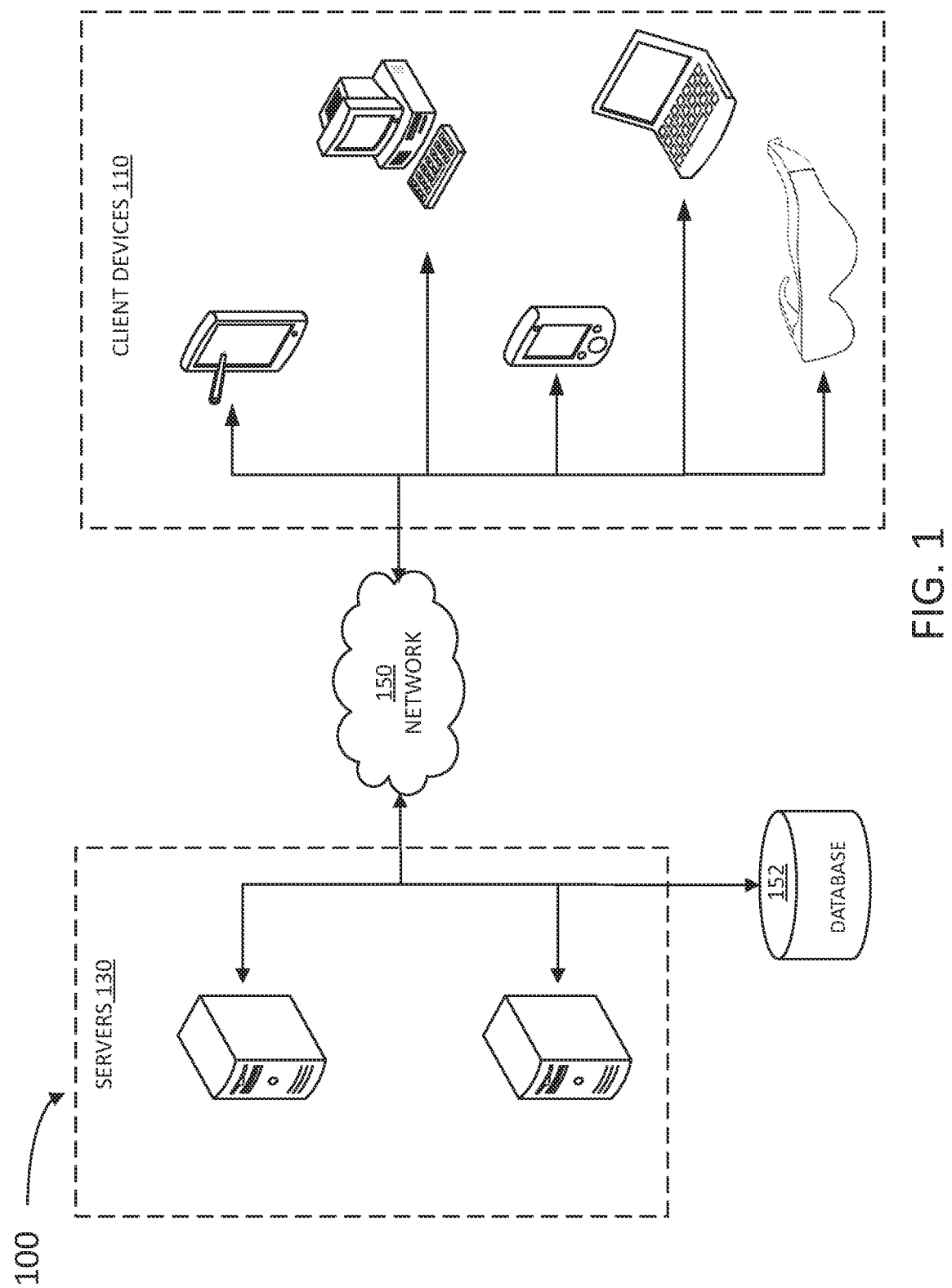
FIG. 1 illustrates a network architecture configured for ingesting garment models for avatars in immersive reality applications, according to some embodiments.

FIG. 1 illustrates an example architecture 100 suitable for accessing a search engine, according to some embodiments. Architecture 100 includes servers 130 communicatively coupled with client devices 110 and at least one database 152 over a network 150. One of the many servers 130 is configured to host a memory including instructions which, when executed by a processor, cause the server 130 to perform at least some of the steps in methods as disclosed herein. In some embodiments, the processor is configured to control a graphical user interface (GUI) for the user of one of client devices 110 accessing the search engine with a social network application. Accordingly, the processor may include a dashboard tool, configured to display components and graphic results to the user via the GUI. For purposes of load balancing, multiple servers 130 can host memories including instructions to one or more processors, and multiple servers 130 can host a history log and a database 152 including multiple training archives used for the search engine. Moreover, in some embodiments, multiple users of client devices 110 may access the same search engine to run one or more searches within a social network. In some embodiments, a single user with a single client device 110 may provide images and data to train one or more machine learning models running in parallel in one or more servers 130. Accordingly, client devices 110 and servers 130 may communicate with each other via network 150 and resources located therein, such as data in database 152.

Servers 130 may include any device having an appropriate processor, memory, and communications capability for hosting the search engine including multiple tools associated with it. The search engine may be accessible by various clients 110 over network 150. Client devices 110 can be, for example, desktop computers, mobile computers, tablet computers (e.g., including e-book readers), mobile devices (e.g., a smartphone or PDA), or any other device having appropriate processor, memory, and communications capabilities for accessing the search engine on one or more of servers 130. In some embodiments, client devices 110 may include VR/AR headsets configured to run an immersive reality application supported by one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
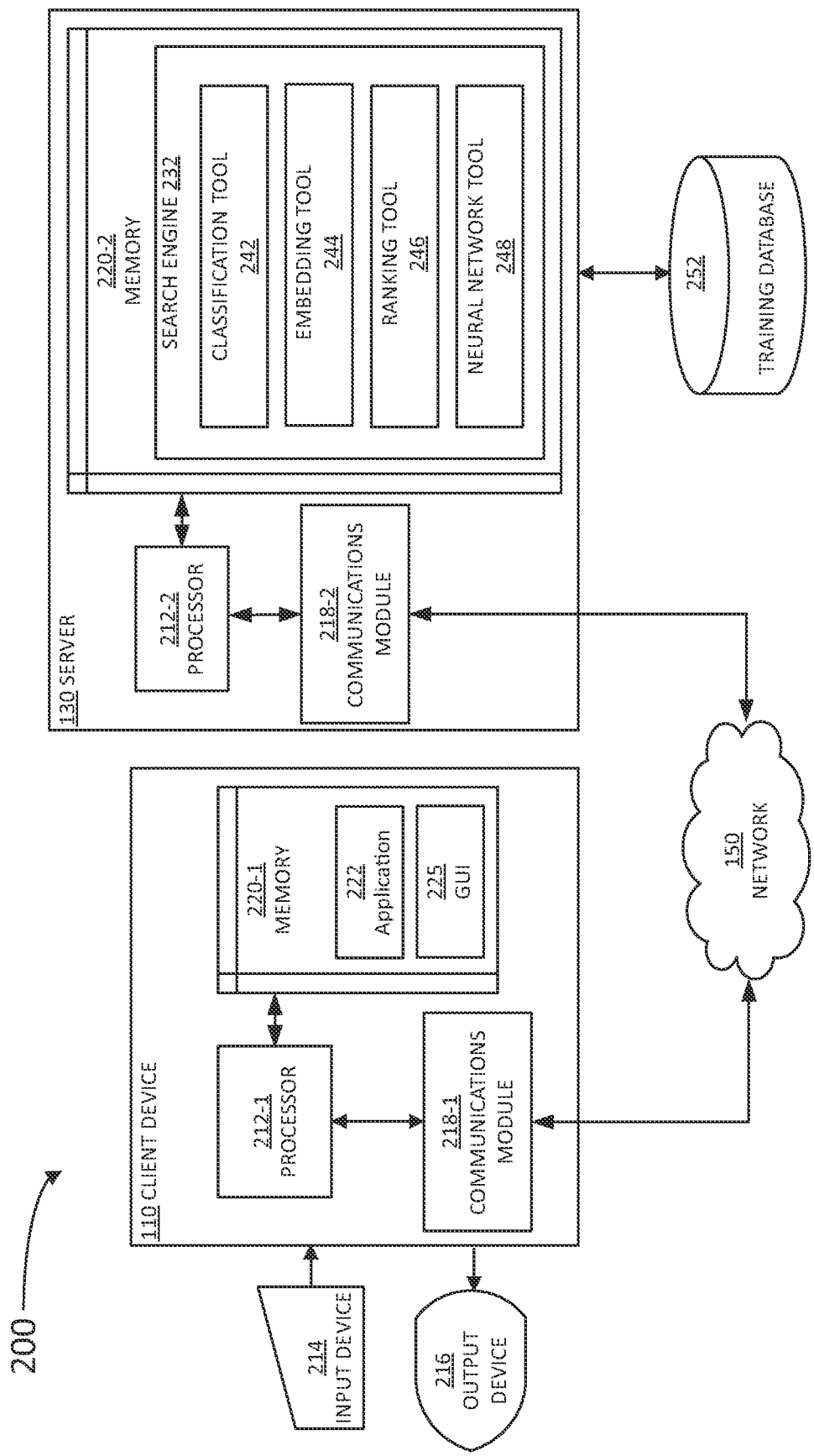
FIG. 2 is a block diagram illustrating a client device and a server for use in the architecture of FIG. 1, according to some embodiments.

FIG. 2 is a block diagram 200 illustrating an example server 130 and client device 110 from architecture 100, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 can be, for example, modems or Ethernet cards, and may include radio hardware and software for wireless communications (e.g., via electromagnetic radiation, such as radiofrequency -RF-, near field communications -NFC-, Wi-Fi, and Bluetooth radio technology). A user may interact with client device 110 via an input device 214 and an output device 216. Input device 214 may include a mouse, a keyboard, a pointer, a touchscreen, a microphone, a joystick, a virtual joystick, and the like. In some embodiments, input device 214 may include cameras, microphones, and sensors, such as touch sensors, acoustic sensors, inertial motion units -IMUs- and other sensors configured to provide input data to a VR/AR headset. For example, in some embodiments, input device 214 may include an eye tracking device to detect the position of a user's pupil in a VR/AR headset. Output device 216 may be a screen display, a touchscreen, a speaker, and the like. Client device 110 may include a memory 220-1 and a processor 212-1. Memory 220-1 may include an application 222 and a GUI 225, configured to run in client device 110 and couple with input device 214 and output device 216. Application 222 may be downloaded by the user from server 130 and may be hosted by server 130. In some embodiments, client device 110 is a VR/AR headset and application 222 is an immersive reality application. In some embodiments, client device 110 is a mobile phone used to collect a video or picture and upload to server 130 using a video or image collection application 222, to store in training database 252.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes a search engine 232. Search engine 232 may share or provide features and resources to GUI 225, including multiple tools associated with image or video collection, capture, or design applications that use images or pictures retrieved with search engine 232 (e.g., application 222). The user may access search engine 232 through application 222, installed in a memory 220-1 of client device 110. Accordingly, application 222, including GUI 225, may be installed by server 130 and perform scripts and other routines provided by server 130 through any one of multiple tools. Execution of application 222 may be controlled by processor 212-1.

Search engine 232 may include a classification tool 242, an embedding tool 244, a ranking tool 246, and a neural network tool 248. Classification tool 242 collects input images or other media objects in a network and determines a semantic context of the image or media object, which may be a textual caption in a given language. An embedding tool 244 splits the caption in different components, and associates (e.g., "embeds") a numeric value to each, thus forming a vector in a multidimensional space. The vector is uniquely associated with the media object. A distance between different vectors in the multidimensional space formed by embedding tool 244 may be indicative of a similarity between the media files (e.g., images) associated with each vector. Ranking tool 246 determines the distance between points in the multidimensional space and creates ranked lists of points or associated media files based on the distance. Neural network tool 248 trains classification tool 242, embedding tool 244, and ranking tool 246 in search engine 232 to provide accurate and likable search results from a user query.

In some embodiments, neural network tool 248 may be part of one or more machine learning models stored in a training database 252. Training database 252 includes training archives and other data files that may be used by search engine 232 in the training of a machine learning model, according to the input of the user through application 222. Moreover, in some embodiments, at least one or more training archives or machine learning models may be stored in either one of memories 220 and the user may have access to them through application 222.

Neural network tool 248 may include algorithms trained for the specific purposes of the engines and tools included therein. The algorithms may include machine learning or artificial intelligence algorithms making use of any linear or non-linear algorithm, such as a neural network algorithm, or multivariate regression algorithm. In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. In some embodiments, training database 252 may include a training archive to modify coefficients according to a desired outcome of the machine learning model. Accordingly, in some embodiments, search engine 232 is configured to access training database 252 to retrieve documents and archives as inputs for the machine learning model. In some embodiments, search engine 232, the tools contained therein, and at least part of training database 252 may be hosted in a different server that is accessible by server 130 or client device 110.

Figure 3:
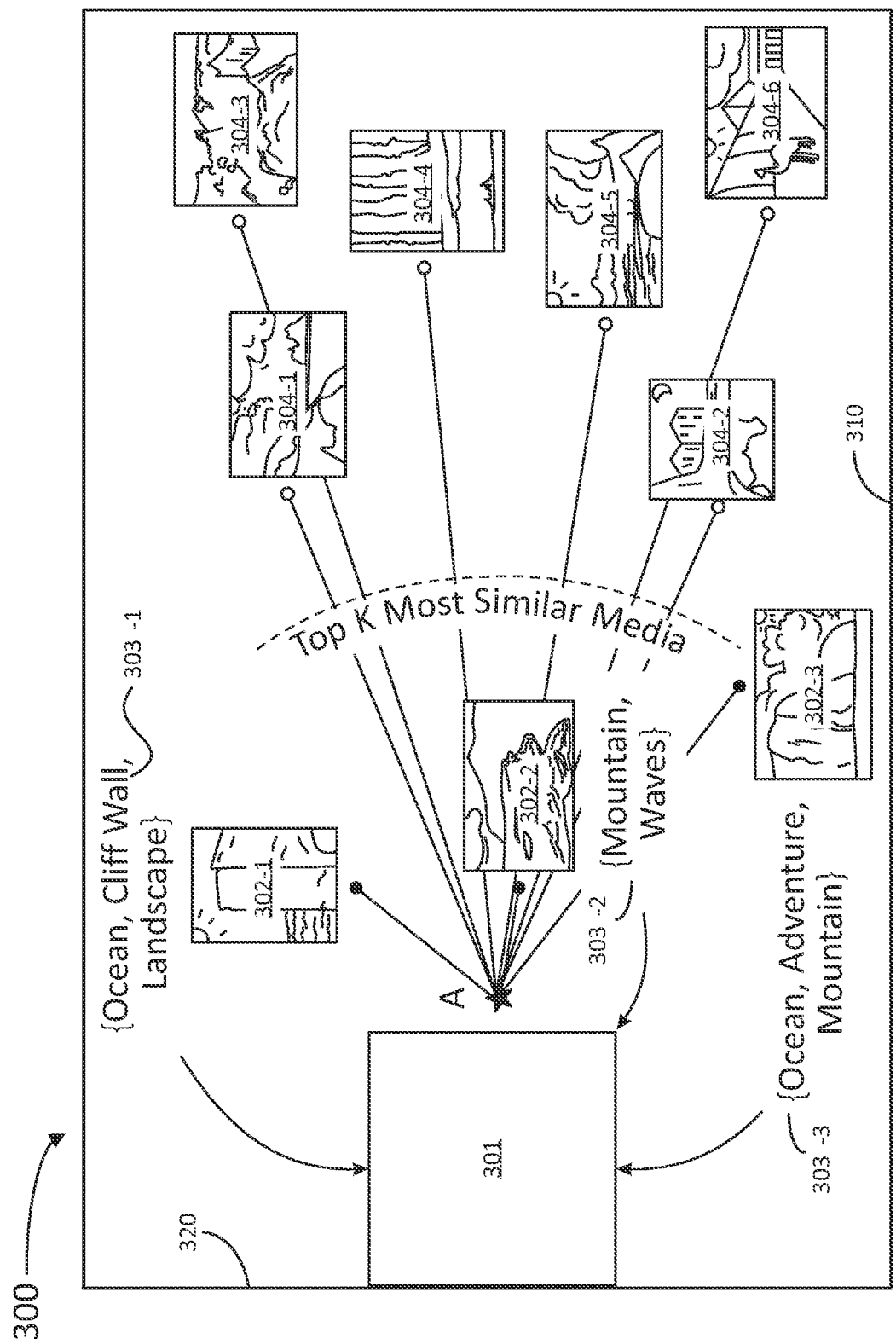
FIG. 3 illustrates a search query in a multidimensional space defined by semantic content, according to some embodiments.

FIG. 3 illustrates a search query 301 in a multidimensional space 300 defined by semantic content, according to some embodiments. A user enters a search query 301 as a text string in a first language (e.g., English, Chinese, Arabic, the characters notwithstanding). Search query 301 may be a text string "coastline" for images or media files stored in a database. The system identifies a semantic context and comes up with classifiers such as {ocean, cliff wall, landscape} 303-1, {mountain, waves} 303-2, and {ocean, adventure, mountain} 303-3, which may be closely located to the initial search query (hereinafter, collectively referred to as "classifiers 303"). Each of classifiers 303 is associated with, and can be used as a caption of, a media file (e.g., picture) 302-1, 302-2, and 302-3 (hereinafter, collectively referred to as "media files 302"). The text strings in classifiers 303 and media files 302 are disposed as vectors in multidimensional space 300 according to coordinates 310 (abscissae) and 320 (ordinates) obtained from an embedding that associates a numerical value to the semantic content of the text string along each axis. The use of a two-dimensional cartesian plot is illustrative only, and any number of axis may be used for multidimensional space 300. A distance in multidimensional space 300 is defined as a suitably selected sum of directing cosines of each point along the coordinate axis. Any other metric can be used to define distances in multidimensional space 300. The distance between points in multidimensional space 300 is indicative of the "similarity" between the associated media files 302. Therefore, it is expected that the user may be interested in media files associated with points in space 300 that are close to point A.

The system may then select media fields according to their distance to a point, A, associated with query 301. A ranking tool (cf. ranking tool 246) may select the closest K points (e.g., images 302) to show the user as a search result for query 301. In some embodiments, the ranking tool may select images 302 based on a threshold radius, such that other images 304-1, 304-2, 304-3, 304-4, 304-5, and 304-6 (hereinafter, collectively referred to as "stock media files 304") may not be selected for display to the user.

Figure 4:
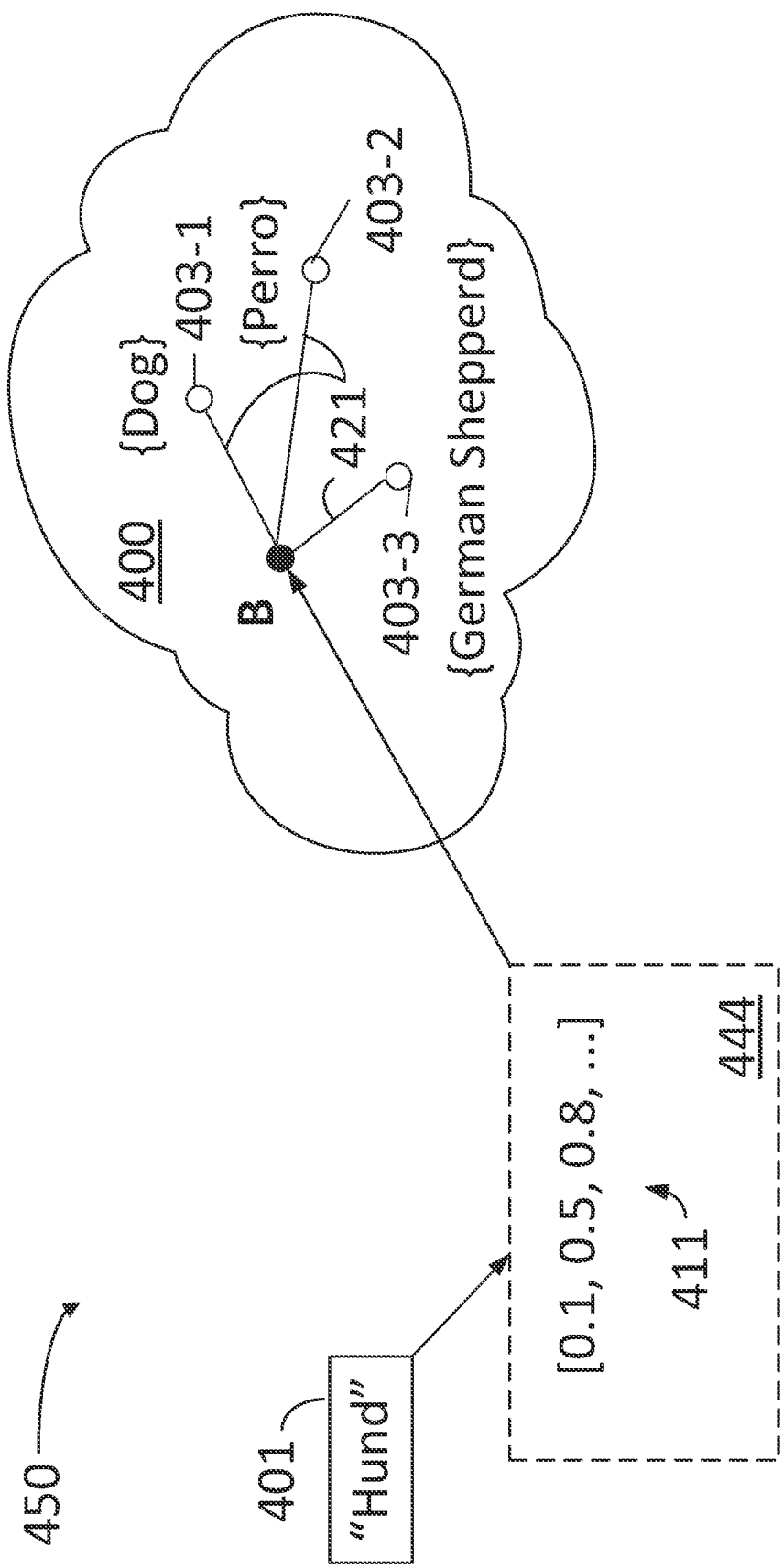
FIG. 4 illustrates an architecture including an embedding of a text string from a query into a multidimensional space, according to some embodiments.

FIG. 4 illustrates an architecture 450 including an embedding 411 of a text string from a query 401 (e.g., "Hund," or the German word for "Dog") into a multidimensional space 400, according to some embodiments. Embedding 411 may be obtained by an embedding tool 444 in a system as disclosed herein (cf. embedding tool 244). Embedding 411 is a sequence of numeric values associated with different coordinates in multidimensional space 400, based on one or more semantic concepts contained in the text string of query 401. A similarity 421 of different text strings, e.g., "Dog," 403-1, "Perro," 403-2, "German Shepperd," 403-3 and the like, hereinafter collectively referred to as "points 403" may be measured as the cosine distance between the points associated with the text strings and the point associated with the search query, B (401).

Architecture 400 is transparent to the language in which the query is provided, or the language for the text strings in points 403 found by the search engine. This is because basis for the similarity search is on the embedding 411 from semantic content in query 401. Likewise, points 403 within multidimensional space 400 have coordinates associated with the semantic content of the associated text strings, regardless of the language associated with each of the text strings. However, in some embodiments, a language similarity may move a point 403 closer to search query B (401), for example, "German Shepperd" 403-3 may be closer to point B (401) than points 403-1 and 403-2 simply because "Hund" is a German dog, and it is more likely that a German speaker with input 401 ("Hund") will be more attracted to a picture or information on German Shepperd dogs.

Figure 5:
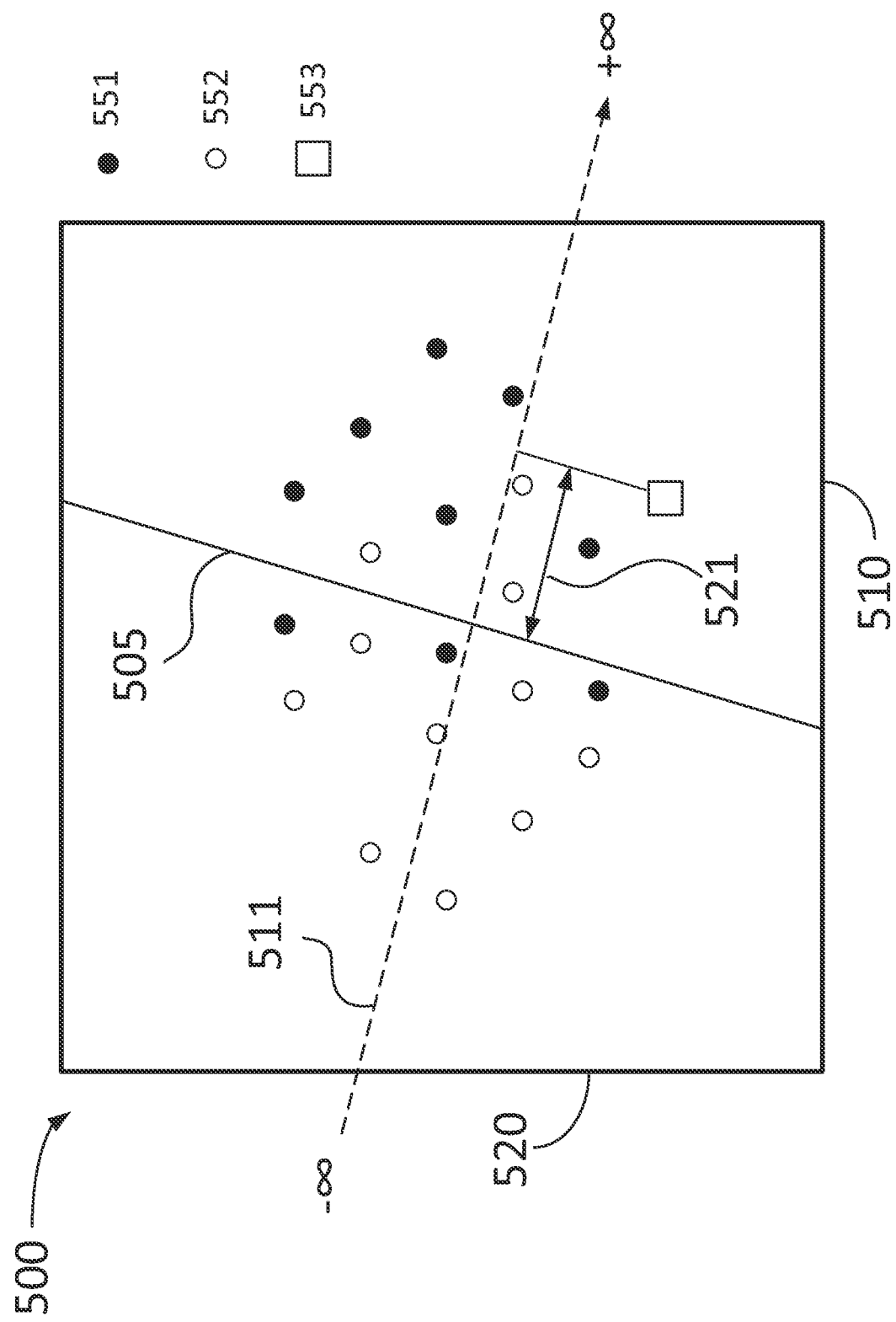
FIG. 5 illustrates a hyperplane defining a normal direction for projecting similarity values in a multidimensional space, according to some embodiments.

FIG. 5 illustrates a hyperplane 505 defining a normal direction 511 for projecting similarity values 521 in a multidimensional space 500, according to some embodiments. In the example, hyperplane 505 separates doglike (551) from catlike (552) items in multidimensional space 500. Note that the specific classifiers 510 for abscissae and 520 for ordinates are not relevant, as hyperplane 505 defines a clear direction 511 to find similarity 521. For example, abscissae 510 may be "quadruped mammal" and ordinates 520 may be "domesticated." Normal axis extends from $-\infty$ to +∞, or from any suitably defined minimum value to a maximum value. As can be seen, the similarity 521 of an item (e.g., "wolf" 553) is a projection of a point in the multidimensional space on the normal axis (a wolf is more "doglike" 551 than catlike "552," but still lower in the "domesticated" ordinate 520 than most dogs and cats).

Figure 6:
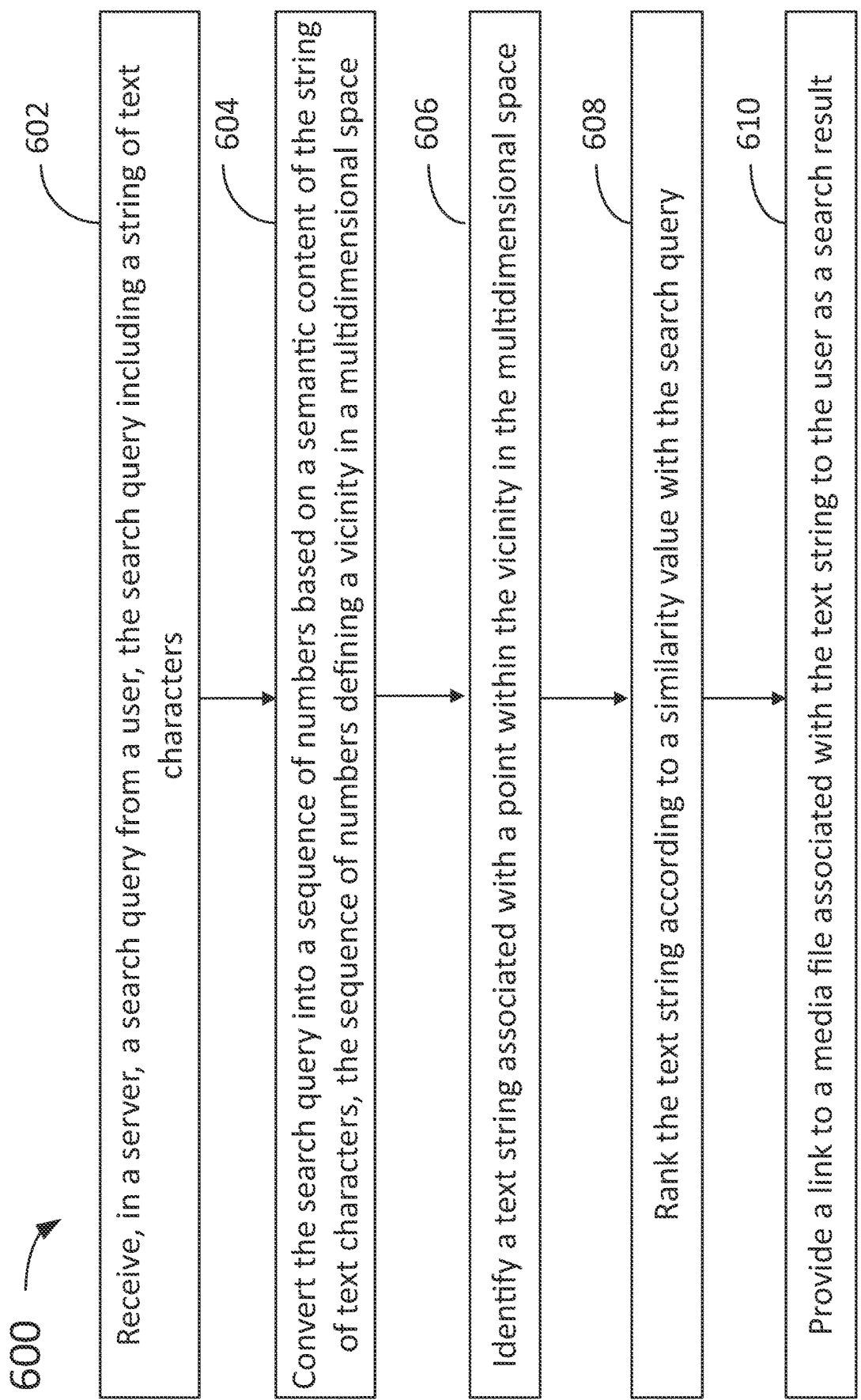
FIG. 6 is a flowchart illustrating steps in a method for ingesting garments in an immersive reality platform, according to some embodiments.

FIG. 6 is a flowchart illustrating steps in a method 600 for providing a search result to a user in a client device, according to some embodiments. In some embodiments, one or more steps in method 600 may be performed by a processor circuit executing instructions stored in a memory circuit of a client device or server as disclosed herein (e.g., processors 212, memories 220, client devices 110, and servers 130). Accordingly, in some embodiments, one or more of the steps in method 600 may be performed by a search engine including a classification tool, an embedding tool, a ranking tool, and a neural network tool, as disclosed herein (e.g., classification tool 242, embedding tool 244, ranking tool 246, and neural network tool 248). Moreover, in some embodiments, a method consistent with this disclosure may include at least one or more steps in method 600 performed in a different order, simultaneously, quasi-simultaneously, or overlapping in time.

Step 602 includes receiving, in a server, a search query from a user, the search query including a string of text characters.

Step 604 includes converting the search query into a sequence of numbers based on a semantic content of the string of text characters, the sequence of numbers defining a vicinity in a multidimensional space. In some embodiments, step 604 includes using a model to associate a value to a semantic content, further comprising updating the model when the user activates the link to the media file. In some embodiments, step 604 includes using a model to associate a value to a semantic content, further comprising updating the model when the user shares the link to the media file with a friend in a social network.

Step 606 includes identifying a text string associated with a point within the vicinity in the multidimensional space. In some embodiments, step 606 includes defining the vicinity of the multidimensional space as an open set of sub-integral values around a point in the multidimensional space defined by the sequence of numbers. In some embodiments, the text string is written in a second language that is different from a first language of the string of text characters, and step 606 further includes translating the text string from the second language to the first language.

Step 608 includes ranking the text string according to a similarity value with the search query. In some embodiments, step 608 includes finding a hyperplane in the multi-dimensional space that defines the similarity value as a normal projection of a point for the text string to the hyperplane.

Step 610 includes providing a link to a media file associated with the text string to the user as a search result. In some embodiments, the media file is associated with an image that is semantically associated with the search query, and step 610 includes providing the image to the user when the user selects the image from the search result. In some embodiments, step 610 includes validating an access for the user to the media file. In some embodiments, step 610 incudes updating the multidimensional space based on a reaction of the user to the media file. In some embodiments, step 610 includes providing to the user a supplementary search query that is a translation of the text string from a different language than the search query.

Figure 7:
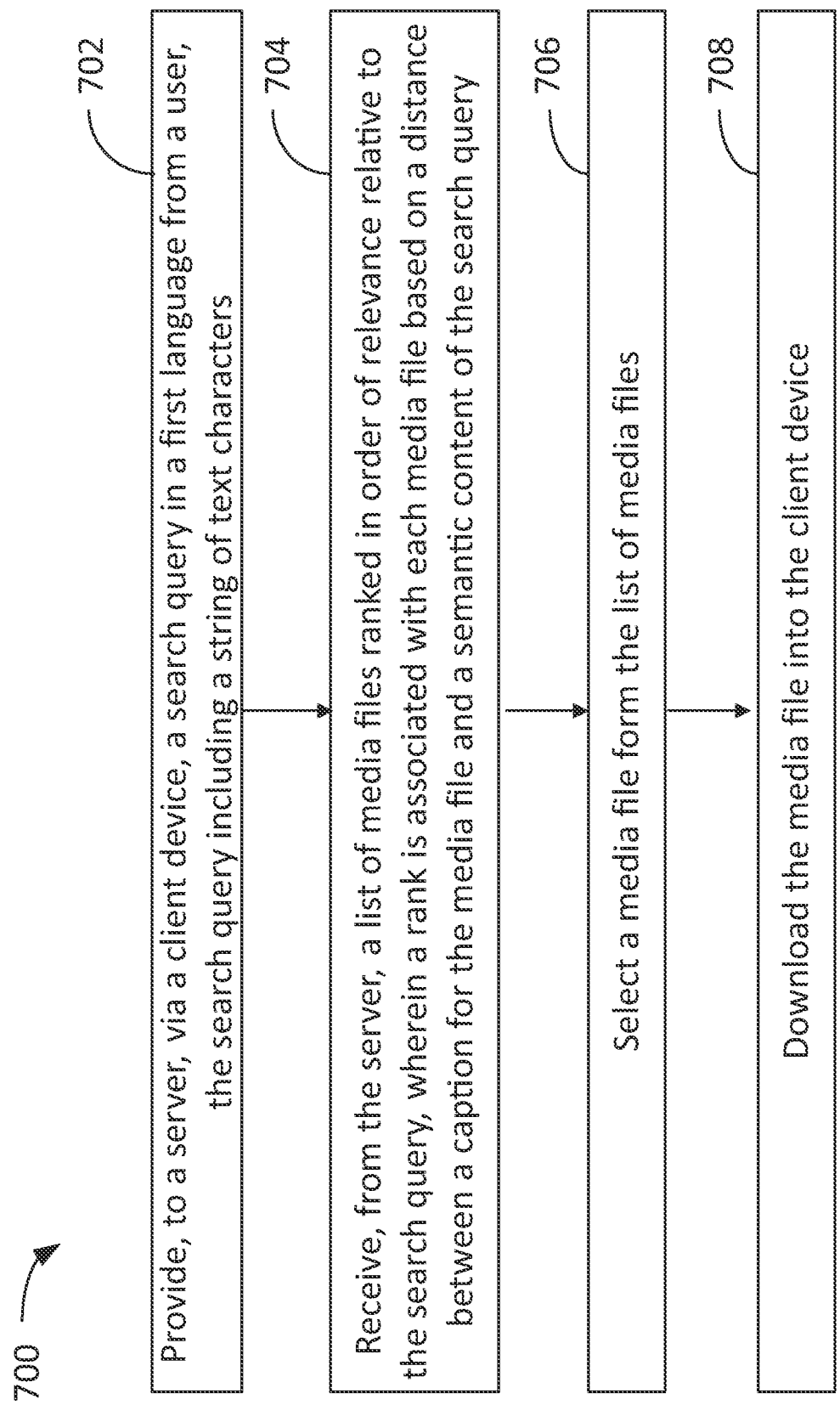
FIG. 7 is a flowchart illustrating steps in a method for generating avatar ready garment models for immersive applications, according to some embodiments.

FIG. 7 is a flow chart illustrating steps in a method 700 for searching and selecting a media file in a search engine accessed by a client device, according to some embodiments. In some embodiments, one or more steps in method 700 may be performed by a processor circuit executing instructions stored in a memory circuit of a client device or server as disclosed herein (e.g., processors 212, memories 220, client devices 110, and servers 130). Accordingly, in some embodiments, one or more of the steps in method 700 may be performed by a search engine including a classification tool, an embedding tool, a ranking tool, and a neural network tool, as disclosed herein (e.g., classification tool 242, embedding tool 244, ranking tool 246, and neural network tool 248). Moreover, in some embodiments, a method consistent with this disclosure may include at least one or more steps in method 700 performed in a different order, simultaneously, quasi-simultaneously, or overlapping in time.

Step 702 includes providing, to a server, via a client device, a search query in a first language from a user, the search query including a string of text characters.

Step 704 includes receiving, from the server, a list of media files ranked in order of relevance relative to the search query, wherein a rank is given based on a distance between a caption for each media file and a semantic content of the search query.

Step 706 includes selecting a media file from the list of media files.

Step 708 includes downloading the media file into the client device. In some embodiments, step 708 includes receiving a supplemental search query for a narrower search when no media file is selected, wherein the supplemental search query is a translation of a text string identified by the server in a vicinity of a multidimensional space defined by a semantic content in the search query, the text string in a second language different from the first language. In some embodiments, step 708 includes allowing the client device to provide a location to the server, to identify the semantic content of the search query. In some embodiments, step 708 includes selecting a language option from a portal in the server to be the first language. In some embodiments, step 708 includes selecting a semantic classifier for the search query from a portal in the server.

Hardware Overview

Figure 8:
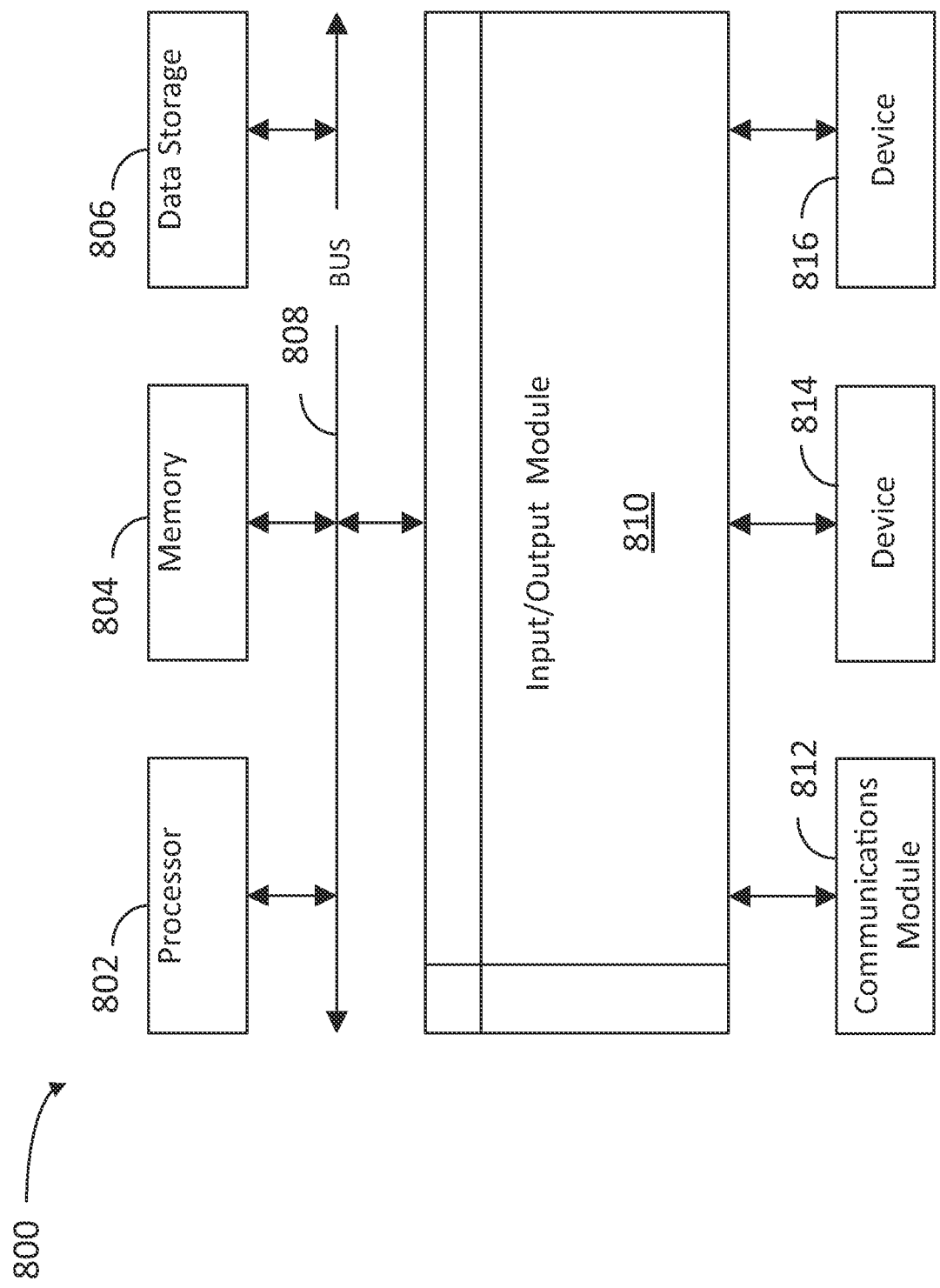
FIG. 8 is a block diagram illustrating components in a computer system for performing methods as disclosed herein, according to some embodiments.

FIG. 8 is a block diagram illustrating an exemplary computer system 800 with which headsets and other client devices 110, and methods 600 and 700 can be implemented. In certain aspects, computer system 800 may be implemented using hardware or a combination of software and hardware, either in a dedicated server, or integrated into another entity, or distributed across multiple entities. Computer system 800 may include a desktop computer, a laptop computer, a tablet, a phablet, a smartphone, a feature phone, a server computer, or otherwise. A server computer may be located remotely in a data center or be stored locally.

Computer system 800 includes a bus 808 or other communication mechanism for communicating information, and a processor 802 (e.g., processors 212) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer-readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled with bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, input/output module 810 is configured to connect to a plurality of devices, such as an input device 814 and/or an output device 816. Exemplary input devices 814 include a keyboard and a pointing device, e.g., a mouse or a trackball, by which a consumer can provide input to the computer system 800. Other kinds of input devices 814 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 816 include display devices, such as an LCD (liquid crystal display) monitor, for displaying information to the consumer.

According to one aspect of the present disclosure, headsets and client devices 110 can be implemented, at least partially, using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in either one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the clauses, such term is intended to be inclusive in a manner similar to the term "include" as "include" is interpreted when employed as a transitional word in a clause. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following clauses.

What is claimed is:

1. A computer-implemented method, comprising:
receiving, in a server, a search query from a user, the search query including a string of text characters;
converting the search query into a sequence of numbers based on a semantic content of the string of text characters, the sequence of numbers defining a vicinity in a multidimensional space;
defining the vicinity of the multidimensional space as an open set of sub-integral values around a point in the multidimensional space defined by the sequence of numbers;
ranking the text string according to a similarity value with the search query; and providing a link to a media file associated with the text string to the user as a search result.

2. The computer-implemented method of claim 1, wherein converting the search query into the sequence of numbers comprises using a model to associate a value to a semantic content, further comprising updating the model when the user activates the link to the media file.

3. The computer-implemented method of claim 1, wherein converting the search query into the sequence of numbers comprises using a model to associate a value to a semantic content, further comprising updating the model when the user shares the link to the media file with a friend in a social network.

4. The computer-implemented method of claim 1, wherein the text string is written in a second language that is different from a first language of the string of text characters, further comprising translating the text string from the second language to the first language.

5. The computer-implemented method of claim 1, wherein the media file is associated with an image that is semantically associated with the search query, further comprising providing the image to the user when the user selects the image from the search result.

6. The computer-implemented method of claim 1, wherein ranking the text string comprises finding a hyperplane in the multidimensional space that defines the similarity value as a normal projection of a point for the text string to the hyperplane.

7. The computer-implemented method of claim 1, further comprising validating an access for the user to the media file.

8. The computer-implemented method of claim 1, further comprising updating the multidimensional space based on a reaction of the user to the media file.

9. The computer-implemented method of claim 1, further providing to the user a supplementary search query that is a translation of the text string from a different language than the search query.

10. A system, comprising:
memory storing multiple instructions; and
one or more processors configured to execute the instructions to cause the system to perform operations, comprising:
to receive, in a server, a search query from a user, the search query including a string of text characters;
to convert the search query into a sequence of numbers based on a semantic content of the string of text characters, the sequence of numbers defining a vicinity in a multidimensional space;
to define the vicinity of the multidimensional space as an open set of sub-integral values around a point in the multidimensional space defined by the sequence of numbers;
to rank the text string according to a similarity value with the search query; and
to provide a link to a media file associated with the text string to the user as a search result.

11. The system of claim 10, wherein to convert the search query into the sequence of numbers the one or more processors execute instructions to associate a value to a semantic content, and to update the instructions when the user activates the link to the media file.

12. The system of claim 10, wherein to convert the search query into the sequence of numbers the one or more processors execute instructions to associate a value to a semantic content, and to update the instructions when the user shares the link to the media file with a friend in a social network.

13. The system of claim 10, wherein the text string is written in a second language that is different from a first language of the string of text characters, and the one or more processors execute instructions to translate the text string from the second language to the first language.

14. A computer-implemented method, comprising:
providing, to a server, via a client device, a search query in a first language from a user, the search query including a string of text characters;
receiving, from the server, a list of media files ranked in order of relevance relative to the search query, wherein a rank is given based on a distance between a caption for each media file and a semantic content of the search query;
selecting, a media file from the list of media files;
downloading the media file into the client device; and
receiving a supplemental search query for a narrower search when no media file is selected, wherein the supplemental search query is a translation of a text string defined by the server in a vicinity of a multidimensional space as an open set of sub-integral values around a point in the multidimensional space defined by a sequence of numbers, and wherein the text string in a second language different from the first language.

15. The computer-implemented method of claim 14, further comprising allowing the client device to provide a location to the server, to identify the semantic content of the search query.

16. The computer-implemented method of claim 14, further comprising selecting a language option from a portal in the server to be the first language.

17. The computer-implemented method of claim 14, further comprising selecting a semantic classifier for the search query from a portal in the server.

\* \* \* \* \*